United States Patent [19]

Kemnitz

[11] Patent Number: 5,778,533
[45] Date of Patent: Jul. 14, 1998

[54] METHOD OF PRODUCING A ONE-PART COOLING DUCT PISTON

[75] Inventor: Peter Kemnitz, Leutenbach, Germany

[73] Assignee: Mahle GmbH, Stuttgart, Germany

[21] Appl. No.: 849,226

[22] PCT Filed: Oct. 21, 1995

[86] PCT No.: PCT/DE95/01481

§ 371 Date: May 30, 1997

§ 102(e) Date: May 30, 1997

[87] PCT Pub. No.: WO96/20340

PCT Pub. Date: Jul. 4, 1996

[30] Foreign Application Priority Data

Dec. 24, 1994 [DE] Germany ............... 44 46 726.5

[51] Int. Cl.[6] ............................................. F02F 3/22
[52] U.S. Cl. ................... 29/888.049; 29/888.04;
29/558; 123/193.6; 92/186
[58] Field of Search ................. 123/193.6, 193.4;
92/186; 29/888.049, 888.04, 557, 558

[56] References Cited

U.S. PATENT DOCUMENTS

| | | | |
|---|---|---|---|
| 3,413,897 | 12/1968 | Atkin | 29/888.04 |
| 3,464,100 | 9/1969 | Foulet | 29/888.045 |
| 4,608,947 | 9/1986 | Stadler | 123/41.39 |
| 4,847,964 | 7/1989 | Adams et al. | 29/156.5 R |
| 4,878,466 | 11/1989 | Storchevoi | 123/193.4 |
| 5,052,280 | 10/1991 | Kopf et al. | 92/186 |
| 5,144,923 | 9/1992 | Leites et al. | 29/888.04 |
| 5,150,517 | 9/1992 | Leites et al. | 29/888.04 |
| 5,261,363 | 11/1993 | Kemnitz | 123/193.6 |
| 5,357,920 | 10/1994 | Kemnitz et al. | 123/193.6 |

FOREIGN PATENT DOCUMENTS

| | | |
|---|---|---|
| 695877 | 8/1940 | Germany. |
| 830587 | 1/1952 | Germany. |
| 1165934 | 3/1964 | Germany. |
| 1301629 | 8/1969 | Germany. |
| 2130736 | 3/1972 | Germany. |
| 3502248 | 5/1986 | Germany. |
| 3643039 | 6/1988 | Germany. |
| 4112889 | 10/1991 | Germany. |
| 4134529 | 5/1992 | Germany. |
| 4134530 | 5/1992 | Germany. |
| 4208037 | 9/1993 | Germany. |
| 4221240 | 1/1994 | Germany. |

*Primary Examiner*—Weilun Lo
*Attorney, Agent, or Firm*—Collard & Roe, P.C.

[57] ABSTRACT

The invention concerns a method of producing a one-part piston which, in the region of the piston ring zone, has a closed cooling duct and a recess between the piston ring zone and the box-shaped piston body. The method comprises the following steps: a piston blank is produced by a forging process; the annular recess is produced by machining, the axial height of the recess corresponding at least to the axial height of the cooling duct; the cooling duct, which is open at the bottom, is produced by machining; hub bores are formed and the outer contour of the piston is finished; and the cooling duct, which is open at the bottom, is closed by a two-part cover ring.

6 Claims, 2 Drawing Sheets

METHOD OF PRODUCING A ONE-PART COOLING DUCT PISTON

BACKGROUND OF THE INVENTION

1. Field of the Invention

The invention relates to a method of producing a one-part cooling duct piston.

2. The Prior Art

Such a piston, which is manufactured from steel by the casting process, is known from practical operation. So as to obtain in this connection a closed cooling duct, releasable casting cores have to be used, which complicate the production process and make it expensive.

A one-part cooling duct piston is also known from U.S. Pat. No. 4,608,947. However, this reference does not teach anything regarding the method of producing such a piston.

SUMMARY OF THE INVENTION

The present invention deals with the problem of producing in a constructionally simple way a one-part cooling duct piston having a closed cooling duct.

Said problem is solved with a method for producing a one-part cooling duct piston having a closed cooling duct annularly extending in the piston crown at the level of the piston ring band and an annular recess between the piston ring band and the box-shaped piston shaft, whereby the piston shaft is connected with the piston bosses suspended on the piston crown. The method comprises forging a piston blank, machining an annular recess between the piston ring band and the box-shaped piston shaft, machining a downwardly-open cooling duct, producing boss bores and finishing the outer contour of the piston, and closing the downwardly-open cooling duct with a cover ring.

In regard to the state of the art, the design of a jointed piston (articulated piston) needs to be mentioned as well, where the crown of the piston is connected with the piston pin separately from the piston shaft only via said pin (see, for example, DE-OS 36 43 039). With such a jointed piston, provision is made in the crown of the piston for a cooling duct that is open at the bottom, such duct being closed with a divided sheet metal ring. The manufacture of such a cooling duct is possible only by dividing the piston in two parts, which, however, leads to increased expenditure in the manufacture of the jointed piston because the piston shaft, for example, has to be additionally machined separately. In addition, as compared to the one-part piston according to the invention, such jointed piston requires a longer piston pin, which increases the weight.

BRIEF DESCRIPTION OF THE DRAWINGS

A cooling duct piston produced by the method according to the invention is explained in greater detail in the following on a preferred exemplified embodiment shown in the drawing, in which.

DETAILED DESCRIPTION OF THE PREFERRED EMBODIMENTS

Figure 1:
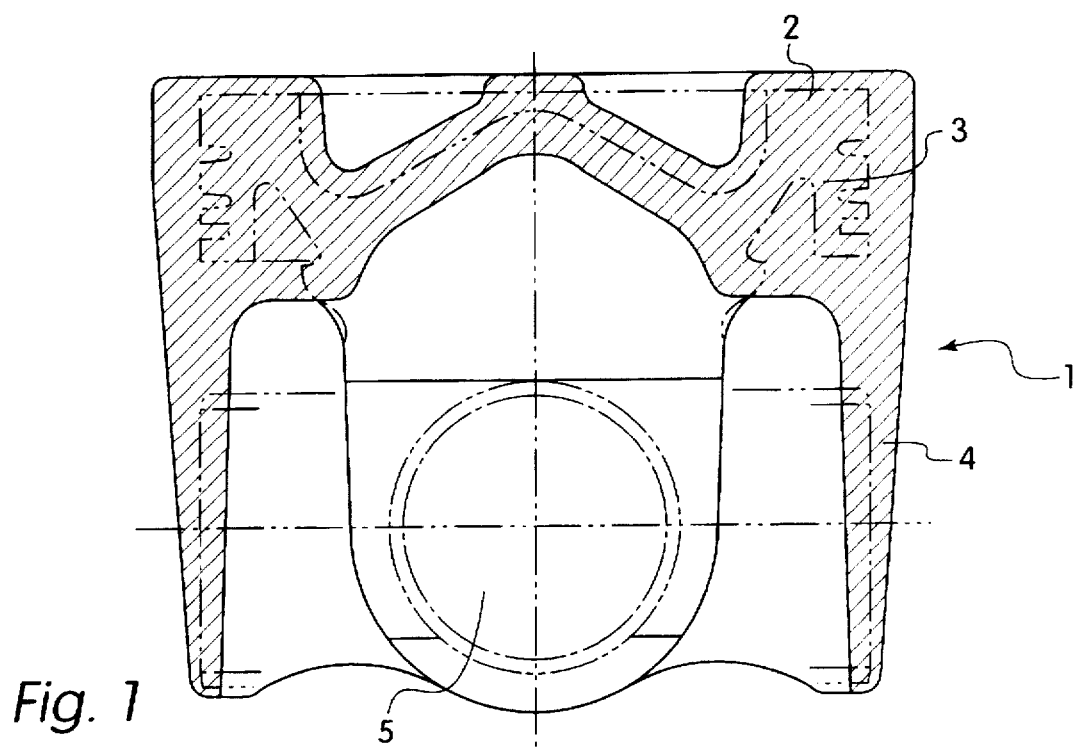
FIG. 1 shows a lateral, partly sectional view of a piston blank according to the invention.
Figure 2:
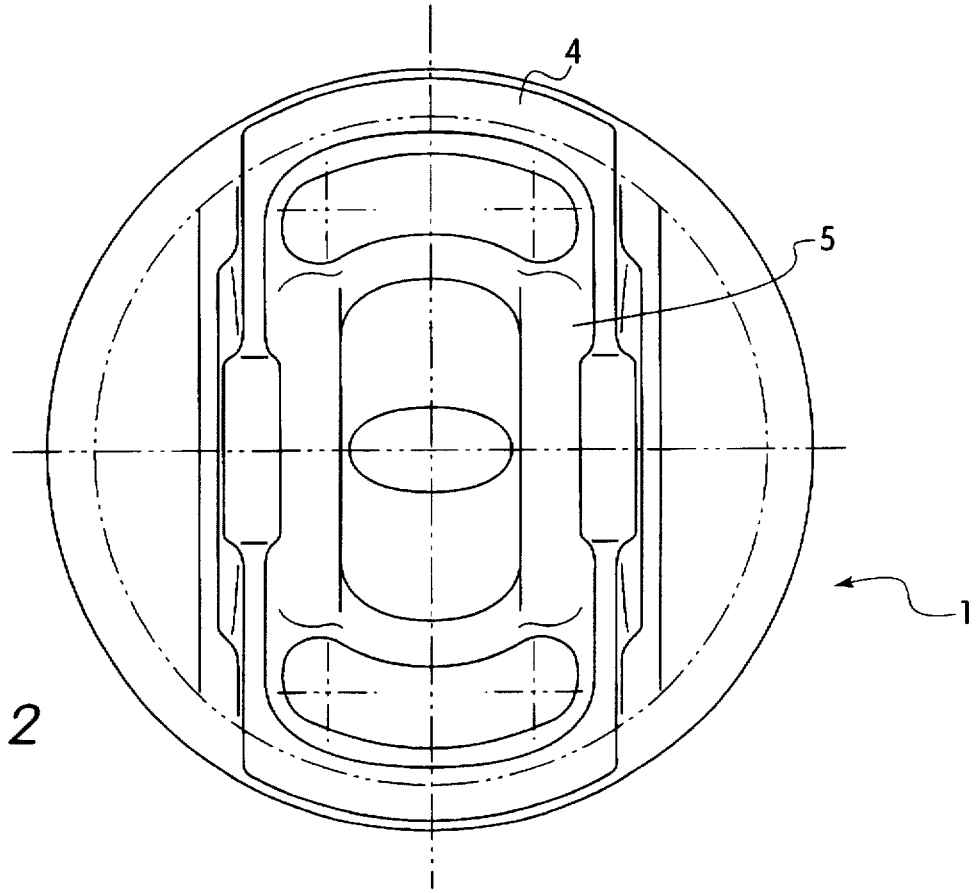
FIG. 2 shows a bottom view of the piston blank.

FIGS. 1 and 2 show a one-part piston blank 1 produced according to a known drop-forging process. The contour of the finished piston is indicated by dash-dotted lines. Piston blank 1 comprises a piston crown 2 with piston ring band 3 produced later, a piston shaft 4, and piston bosses 5 suspended on piston crown 2. Said piston blank can be produced from a forgeable steel or Al-alloy.

Figure 3:
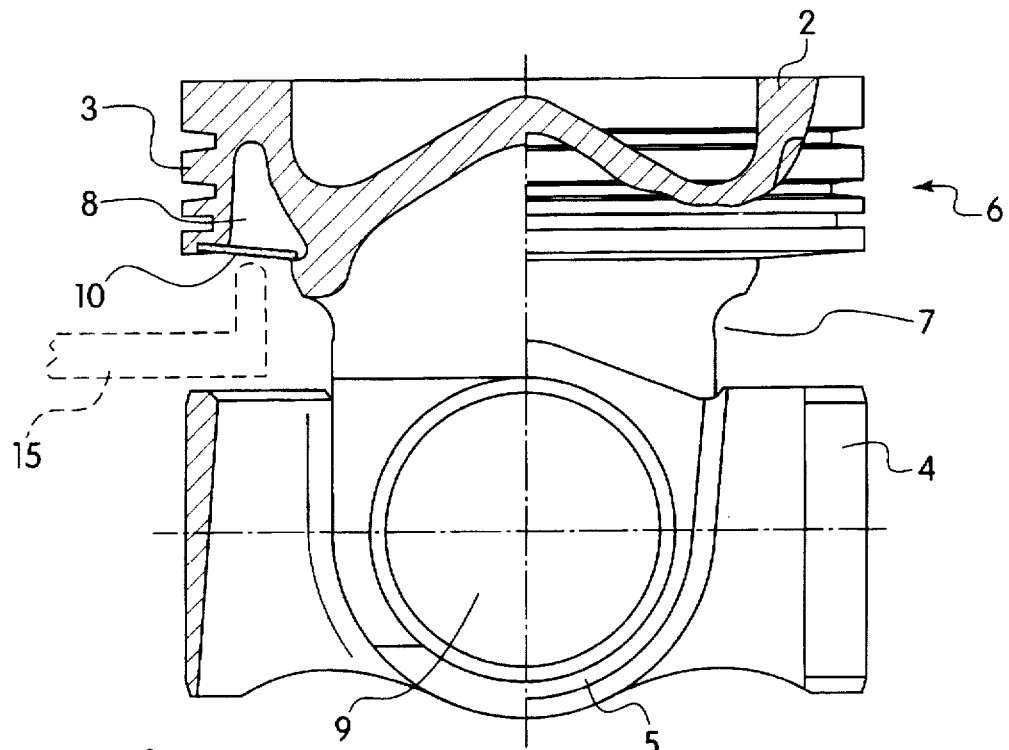
FIG. 3 shows a lateral, partly sectional view of the finished piston.
Figure 4:
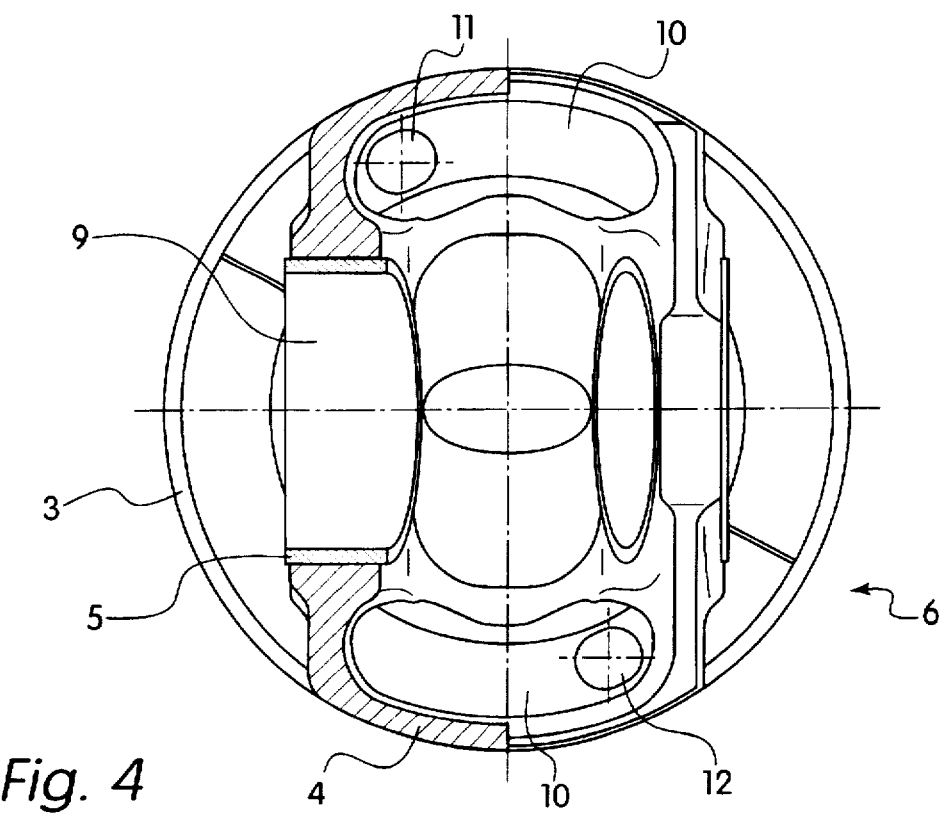
FIG. 4 shows a bottom, partly sectional view of the finished piston.

FIGS. 3 and 4 show the finished piston 6 produced by the method according to the invention. In a first process step, piston blank 1 is provided with an annular recess 7 by machining (turning), whereby its axial height is slightly greater than the height of the later cooling duct 8. Piston crown 2 is thereby separated from piston shaft 4 in such a way that piston shaft 4 is connected with piston crown 2 only via the piston bosses 5. For producing the downwardly open cooling duct 8, a hook-like turning tool 15 is inserted in recess 7 and cooling duct 8 is turned into the desired shape by setting the tool 15 axially and radially as required. Subsequently, boss bores 9 are produced in the known way and the outer contour of piston 6 is finished by machining.

For closing the downwardly open cooling duct 8, a cover ring 10 divided in two parts (e.g. a divided disk spring) is inserted with initial stress on piston crown 2 in matching supports. Cover ring 10 is provided with an inlet aperture 11 and an outlet aperture 12 for the cooling oil.

A one-part piston with a closed cooling duct is produced by such a method at favorable cost, such piston having, for example greater strength as compared to pistons manufactured by a casting process, because the piston material can be selected freely, i.e., forged steel or forgeable Al-alloy, so that such piston is better suitable for highly stressed Diesel engines.

What is claimed is:

1. Method of producing a one-piece piston for an engine from a piston blank, with a closed cooling duct annularly extending in a piston crown at a level of a piston ring band, and with an annular recess between the piston ring band and a box-shaped piston shaft, wherein the piston shaft is connected with piston bosses suspended on the piston crown, characterized by the following steps:

forging the piston blank (1);

machining the annular recess (7);

machining a downwardly open cooling duct (8);

producing the boss bores (9) and finishing the outer contour of the piston (6);

closing the downwardly open cooling duct (8) with a cover ring (10).

2. Method according to claim 1, characterized in that the axial height of the annular recess (7) at least conforms to the axial height of the cooling duct.

3. Method according to claim 1, characterized in that the cover ring (10) is divided in two parts.

4. Method according to claim 1, wherein the step of machining the cooling duct comprises inserting a hook-like turning tool into a recess in the cooling duct (8) and setting the turning tool axially and radially to turn the cooling duct into a desired shape.

5. Method according to claim 1, characterized in that a forgeable, heat-resisting steel is used as the piston material.

6. Method according to claim 1, characterized in that a forgeable Al-alloy is used as the piston material.

* * * * *